United States Patent

[11] 3,631,394

[72] Inventors Jerome Danforth Harr
San Jose;
Reynold Benjamin Johnson, Palo Alto;
Ralph Eugene Marrs, Campbell; Ernie George Nassimbene; George Edmund Price, both of San Jose, all of Calif.

[21] Appl. No. 888,626
[22] Filed Dec. 29, 1969
[45] Patented Dec. 28, 1971

[73] Assignee International Business Machines Corporation
Armonk, N.Y.

[54] CHARACTER RECOGNITION SCANNING APPARATUS
6 Claims, 12 Drawing Figs.

[52] U.S. Cl. .... 340/146.3 F, 178/7.6, 250/233
[51] Int. Cl. .... G06k 7/14
[50] Field of Search .... 178/7.6, 7.1, 7.9, 7.91, 4, 4.1, 42; 235/61.11 E; 340/146.3 R; 250/233

[56] References Cited

UNITED STATES PATENTS

| | | | |
|---|---|---|---|
| 2,008,272 | 7/1935 | Briggs | 178/7.6 |
| 2,343,931 | 3/1944 | Rowell | 178/7.6 |
| 3,242,463 | 3/1966 | Baumberger | 340/146.3 |
| 3,502,803 | 3/1970 | Bigenwald et al. | 178/6.6 |
| 3,522,437 | 8/1970 | Bargh | 340/146.3 X |
| 2,389,200 | 11/1945 | Lake | 178/42 |
| 2,898,801 | 8/1959 | Rockafellow | 250/233 X |

OTHER REFERENCES

Lynott et al., IBM Technical Disclosure Bulletin " Transport for Optical Mark-Sense Scanner" Vol. 12, No. 3, Aug., 1969. pp. 408 & 409.

*Primary Examiner*—Maynard R. Wilbur
*Assistant Examiner*—Leo H. Boudreau
*Attorneys*—Hanifin and Jancin and George E. Roush

ABSTRACT: The recognition of human- and machine-readable characters of a family of type of which each character has no more than 12 segments is enhanced by a dual-disk segmented scanning arrangement. The generic-type family format is a medianly quartered parallelogram (MQP) embracing both slanted and upright printing, the latter being more specifically in the format of an orthogonally quartered rectangle (OQR). The scanning apparatus comprises an opto-mechanical subassembly for precisely scanning the short straight line segments in seriatim. A pair of rotating disks are arranged in overlapping relationship with apertures at the point of scan moving in directions substantially normal to each other, and both disks are moving past the scanning point in a direction opposite to the direction of one of the disks. The disks are usually rotating at the same speed and in opposite directions, and the apertures are arranged for scanning a multiplicity of characters for each full rotation of the disks. The apertures are divided into slits and slots with a slit in one disk cooperating with a slot in the other disk moving in the direction of an image line segment under consideration. An opto1-electronic arrangement produces an electric representation in response to the presence and absence of a character line segment in the image. The opto-electronic arrangement comprises a photosensitive diode arranged to receive light from an area on a document. The highest and lowest light values are translated in a positive and negative peak storage circuit coupled to the photosensitive element. A threshold comparator circuit is individually coupled to the positive and negative peak storage circuits for delivering potential levels of values indicating marks or spaces.

INVENTORS
JEROME D. HARR
REYNOLD B. JOHNSON
RALPH E. MARRS
ERNIE G. NASSIMBENE
GEORGE E. PRICE
BY George E Roush
ATTORNEY

CHARACTER RECOGNITION SCANNING APPARATUS

This application is related to the copending U.S. Pat. application Ser. No. 888,628 to Jerome Danforth Harr filed on Dec. 29, 1969, for Character Recognition Photosensing Apparatus and the copending U.S. Pat. application Ser. No. 829,653 filed on June 2, 1969, now U.S. Pat. No. 3,598,218, of Paul Anthony Gilovich, Reynold Benjamin Johnson, Edward Everett Long, David Harwood McMurtry, Ernie George Nassimbene, Thomas Frank O'Rourke and George Edmund Price for Mechanical Type Printing Apparatus. The first copending application relates to the electronic circuitry for use with optical scanner such as described hereinafter but is not limited thereto. The second application relates to mechanical key-responsive type-printing apparatus, particularly for printing constrained characters readily recognized on sight and by optical character recognition apparatus of the type described and claimed herein.

In the contemporary alphameric character printing art, attention is being directed to simplified, low-cost type apparatus and the corresponding type-recognition apparatus for use in conjunction with data-processing systems such as commercial billing systems, and the like, and computer assisted instructional (CAI) systems. In the CAI-systems, the use of character-printing apparatus is particularly helpful as a learning aid in that young children may be developed mentally before they have required the manual art of clearly lettering and writing rapidly. The same equipment is valuable in the teaching process in that automatic grading and selection of predetermined course material may be made along predetermined lines, leaving the teacher free to assist the students in more pedagogical ways.

Optical scanning apparatus, character recognition apparatus, and various forms of auxiliary apparatus have been suggested for this and similar purposes. Examples of this prior art are to be found in the following U.S. Patents:

| | | | |
|---|---|---|---|
| 1,801,430 | 4/1931 | Huffman | |
| 2,343,931 | 3/1944 | Rowell | 178-007.6 |
| 2,975,371 | 3/1961 | Greanias | 328-168 |
| 3,234,392 | 2/1966 | Dickinson | 250-219 |
| 3,309,669 | 3/1967 | Lemelson | 340-146.3 |

and in the literature as follows:

IBM Technical Disclosure Bulletin, Vol. 5, No. 4 Sept. 1962, pp. 57, "Spiral Disc Scanner," D. E. Rutter, IBM Technical Disclosure Bulletin, Vol. 8, No. 3, Aug. 1965, pp. 417–8, "Character Recognition System for Different Size Type," D. Tellep, IBM Technical Disclosure Bulletin, Vol. 11, No. 4, Sept. 1968, pp. 360, "Card Reader for Card at Rest," W. H. Harger.

According to the invention, the objects indirectly referred to hereinbefore and those which will appear hereinafter are attained in optomechanical character recognition scanning apparatus of simplified construction. While the character recognition apparatus according to the invention is adaptable to any contrasted writing or printing, the invention evolved from short line segment recognition with multiple permutations forming characters of a family of type in the general format of parallelogram within a parallelogram. Conveniently, all of the alphameric characters necessary for a very large variety of work can be made up of not more than a dozen short straight line segments arranged two-by-two to make up a parallelogram and two intersecting medians thereof. Such characters are defined as constrained characters based on the format of a medianly quartered parallelogram (MQP) which embraces both slanted and upright printing the latter being a special case in the form of an orthogonally quartered rectangle (OQR) of the 26 letters of the English alphabet and the 10 Arabic numerals. Only a few letters vary much from the conventional, and these are readily recognized upon seeing them in proper context.

According to the invention, the character recognition scanning apparatus comprises two rotating disks overlapping at the point of scan at which point the elements of the disks move substantially orthogonally one to the other. Transparent apertures are arranged in the disks near the peripheries thereof for uncovering each possible segment of the character to be scanned. The apertures are of two general types, denoted slits and slots. A slit in one disk cooperates with a slot in the other. As used hereinafter, the term slit is construed as a short narrow aperture substantially parallel to and moving substantially normally across the line segment scanned and the term slot is construed as a relatively wider and larger, though still small, aperture substantially parallel to and moving more or less along the line segment scanned and functioning much as the optical equivalent of an electric gating pulse.

Light from a suitable conventional source is arranged to impinge on the document in the area scanned and is reflected quantitatively from the background and from the presence or absence of a mark at the point of scan. A conventional photoresponsive device is arranged to intercept the reflected light for application to a suitable conventional amplifying circuit at the output of which appears an analog voltage predominantly of two significant levels denoting mark or space, that is the absence of a mark. Light from the same or another suitable source is directed toward timing apertures on at least one disk and thence to another suitable photoresponsive device forming a timing pulse train. The timing pulse train is applied through a conventional amplifying circuit to circuitry for generating conventional control voltages used for synchronizing subsequent circuits. Other conventional timing pulse generating means can be used if desired, however, as the generating of timing pulse waves forms no part of the invention in and of itself.

According to the invention, the optical viewing and projecting elements are arranged as a subassembly of the scanning apparatus and are readily removable and replaceable. It is contemplated that several different sizes of characters may be recognized by varying the sizes of the subassembly of optical projection elements. The optical elements and a subassembly of cooperating photosensitive elements are mounted in a carrier which is arranged to advance across the document-scanning apparatus. A continuously operating propelling mechanism is arranged along ways in which the carrier moves, and in the case of different sizes of type, the propelling mechanism is adjustable for the different-sized characters.

In order that the advantages of the invention may be readily attained in practice, a description of a preferred embodiment of the invention is given hereinafter, by way of example only, with reference to the accompanying drawing, forming a part of the specification and in which.

Figure 6A:
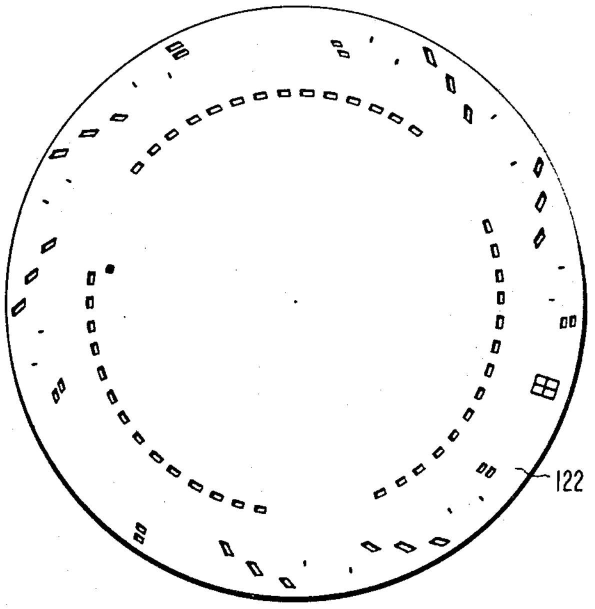
Figure 6B:
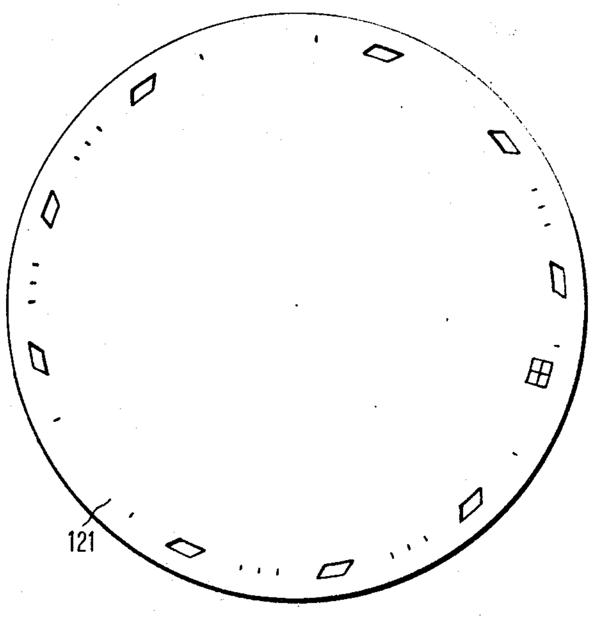
Figure 7:
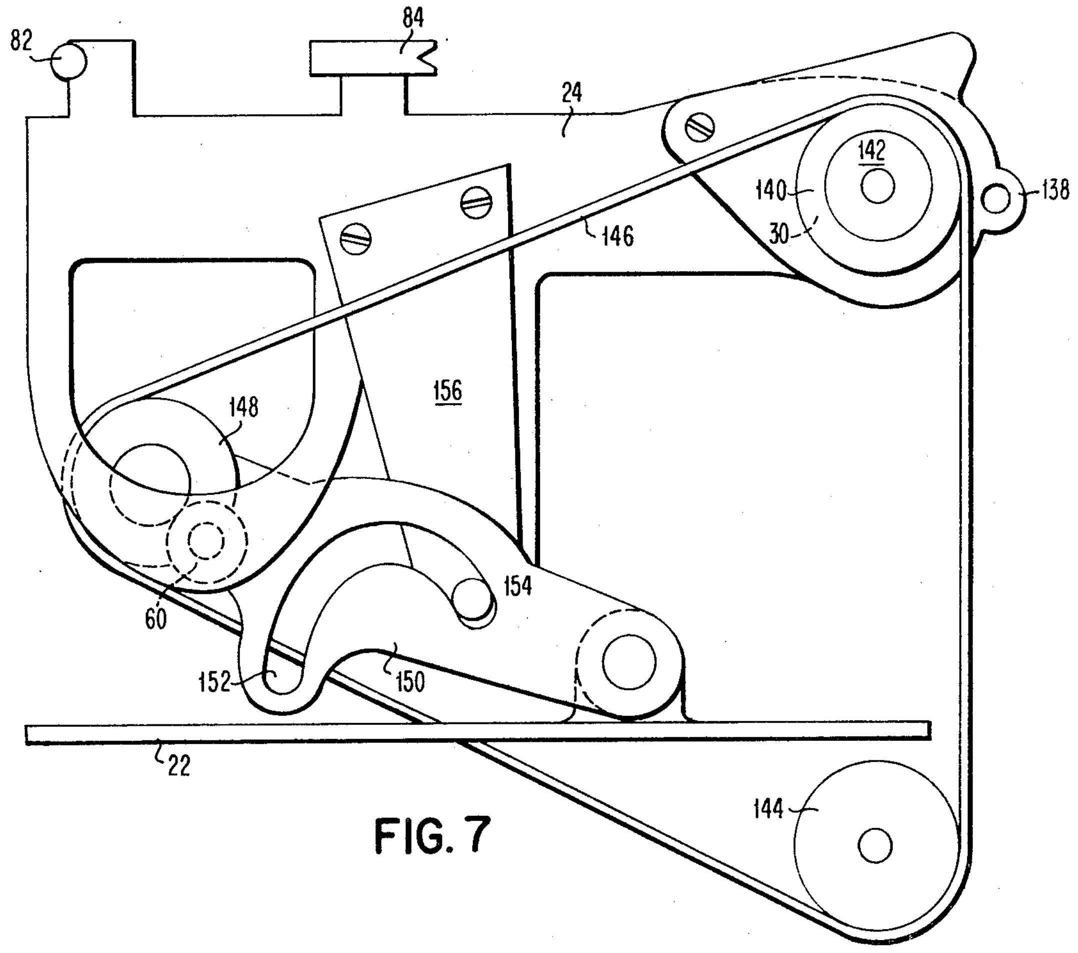
Figure 8:
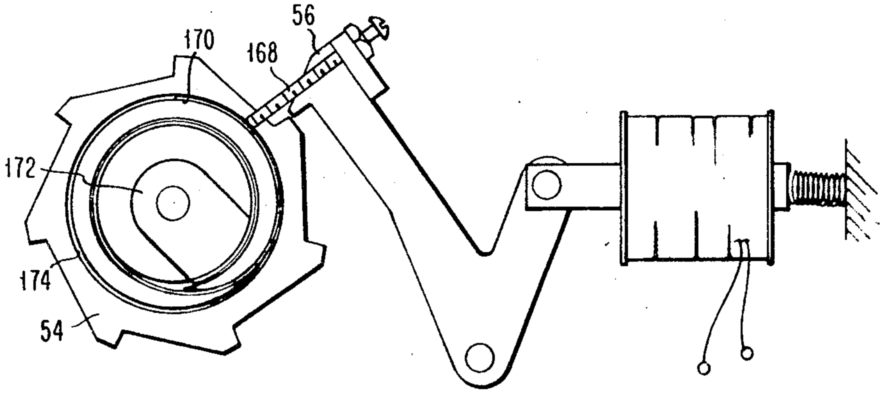

FIGS. 6*a* and 6*b* are plan views of one embodiment of cooperating scanning disks according to the invention;

FIG. 7 is a view of a carrier swinging arrangement according to the invention;

FIG. 8 illustrates the construction of a skip mechanism according to the invention.

Figure 10:
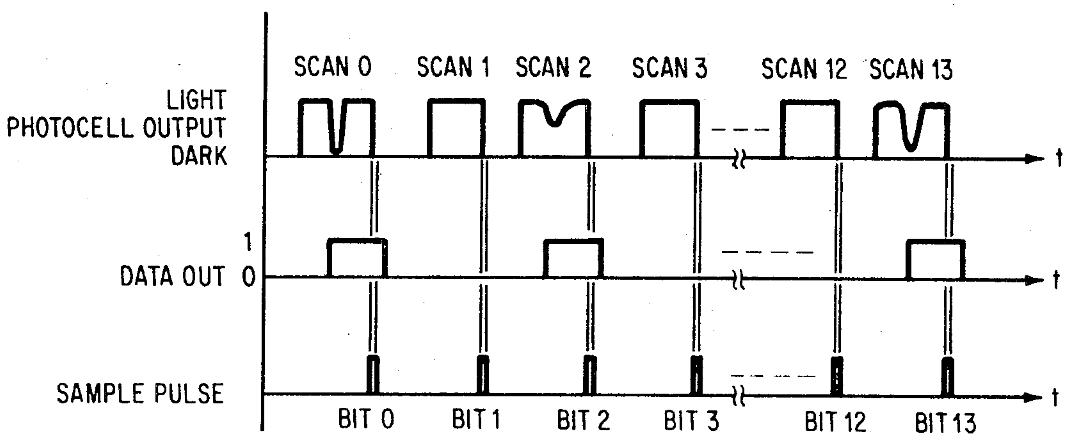
Figure 11:
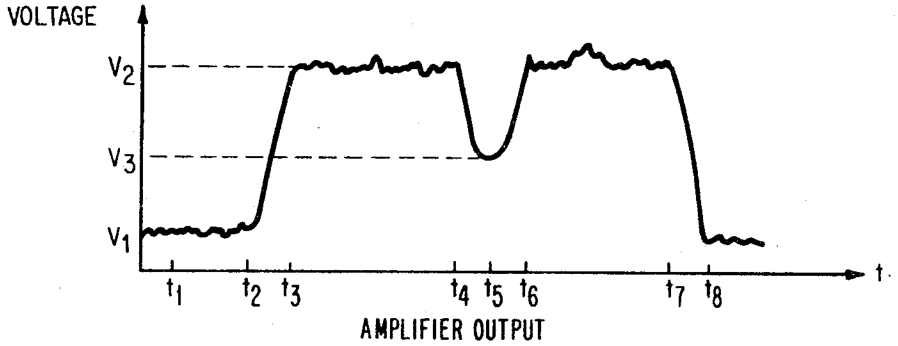
Figure 9:
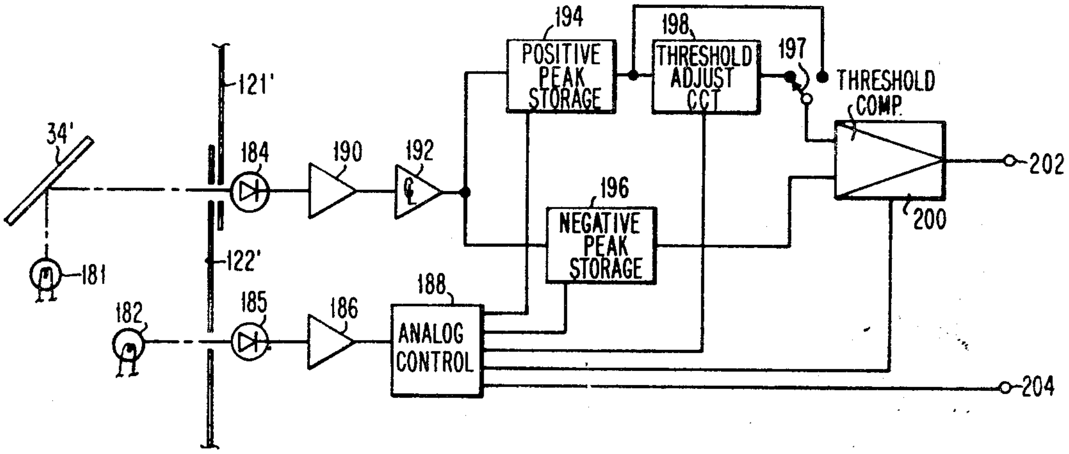

FIG. 9 is a functional diagram of the electronic circuitry according to the invention;

FIG. 10 is a graphical representation of waveforms obtained with the circuitry of FIG. 9; and FIG. 11 is a graphical representation of the mark sense waveform obtained with the optical system according to the invention.

Figure 1:
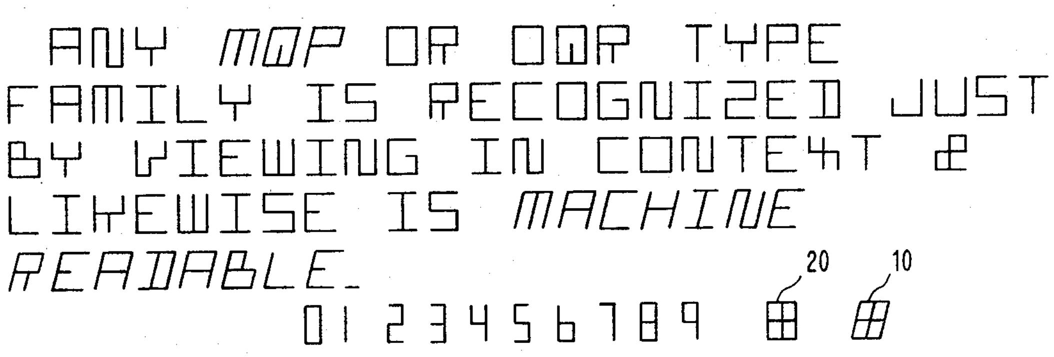
FIG. 1 illustrates one type family of two versions recognizable on sight and by the apparatus according to the invention.

An example of a type family particularly suitable to the scanning apparatus according to the invention is shown in FIG. 1. Two versions of the basic type family are indicated. The "slant" version is based on the medianly quartered parallelogram (MQP) 10. The "upright" version is based on the special case of a right parallelogram or orthogonally quartered rectangle (OQR) 20. Both versions are based generically on a parallelogram within a parallelogram format. The sentence given in the drawing contains at least one example of each letter of the English alphabet followed by the 10 Arabic numerals. Note that the numerals are half the width but of the same height as the alphabetic characters. The usual variations in weight and size of a type series are possible in this type family; these variations can be accommodated by the recognition scanning apparatus according to the invention.

The choice of slant and upright versions is usually made on considerations involving human factors; reading one version may be easier and lettering is usually easier in the "inclined" style corresponding to slant printing than in the "vertical" style which corresponds to the upright printing version. The design considerations of the optical character recognition apparatus for recognizing this type family depend upon the particular version encountered only to slight extent.

Figure 2:
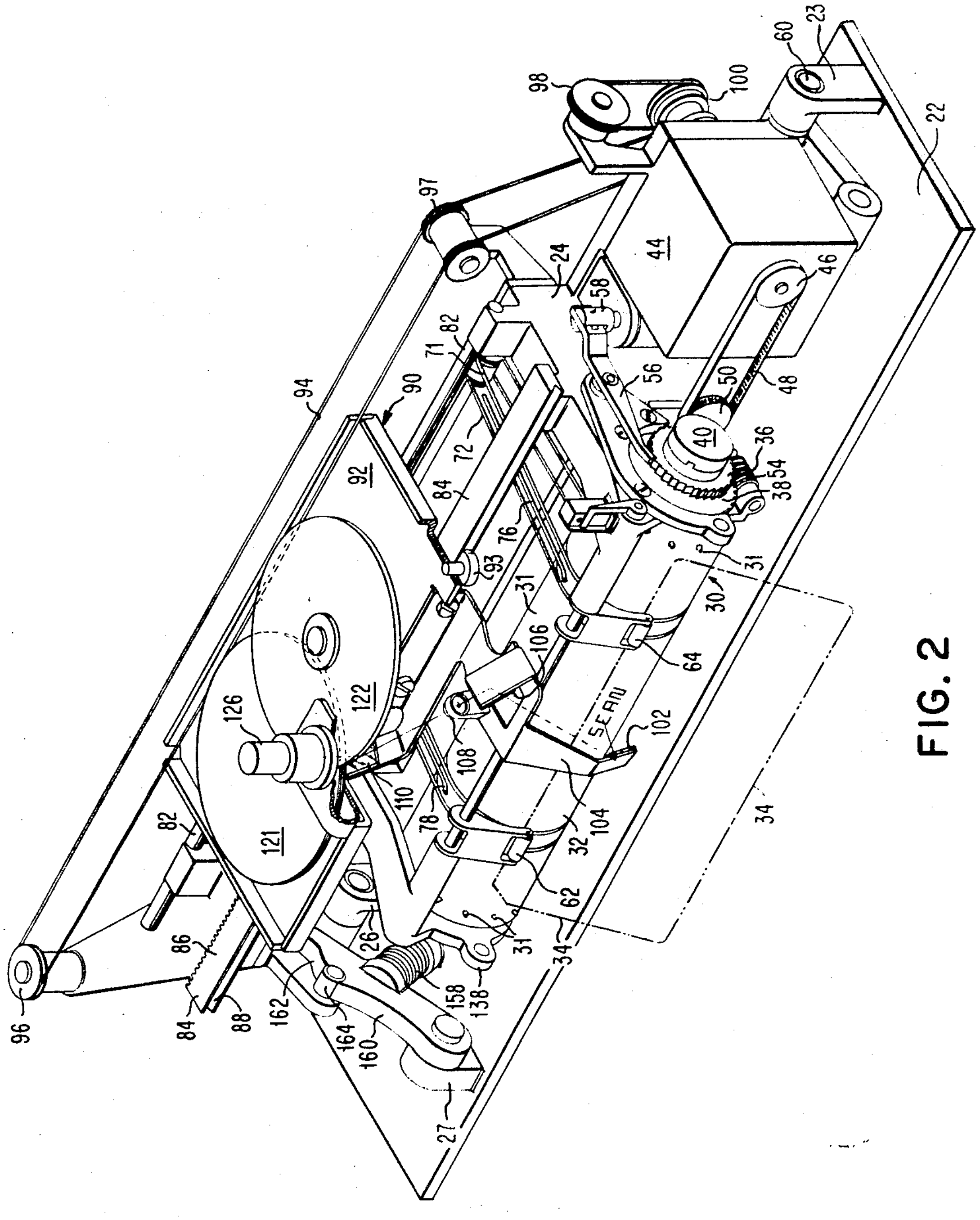
FIG. 2 is an isometric view of character recognition scanning apparatus according to the invention.

An overall view of the scanning apparatus is shown in FIG. 2. A base plate 22 forms the primary support for a number of brackets 23, 24, 25, 26, and 27. The brackets 24 and 25 in turn support a document holding and transporting device which may be similar to any one of the conventional types available, consisting primarily of a pin-feed roll platen 30, preferably with feed pins 31, with a central portion 32 for handling smaller documents such as an information-bearing matrix (IBM) card outlined by the chain line 34. Power is delivered to this central portion by way of a worm 36 and a worm gear 38. The two ends of the platen 30 containing the feed pins 31 are disengaged from the central section 32 by a conventional knob and a ball slip clutch arrangement 40. This allows a paper web to be loaded and positioned manually. Power from a drive motor within a motor-and-gear box 44 flows from a pulley 46 through a friction drive belt 48 to a pulley 50 on the worm shaft for rotating the worm 36. A circular ratchet 54, pawl 56 and solenoid 58 control the feeding movement of the document. The entire arrangement of the motor and gearbox 44, the solenoid 58 and pawl 56, brackets 24 and 25 are carried by and rotate about the axis of a shaft 60. The drive is moving constantly from the motor through the worm gear 38, ratchet wheel 54 and a slip clutch to the clutch 40. This provides a constant torque against the ratchet 54 so that the ratchet and platen 30 will move as soon as the pawl 54 is released.

A series of type families of different size is contemplated for recognition by scanning the apparatus according to the invention. For example, three type families have been found particularly useful in practice. The largest size (termed 3 pitch) measures 3⅓ characters per inch. Each 3-pitch character is 0.18 inches wide and 0.25 inches high, which dimensions are suitable for automatic machine recognition as well as hand lettering and machine printing. Five characters per inch (5-pitch), where the width of each character is 0.125 inches and the height is 0.170 inches, is a convenient size for both machine printing and recognition. A smaller size (termed 10-pitch) with each character 0.08 inches wide and 0.10 inches high, is suitable condensed to afford a great deal of information per document although the machine for recognizing this small character is more expensive due to the tighter tolerances necessary in construction.

In order to accommodate different sizes of type families, the ratchet 54 have at least two sections side by side with two pawls 56 to provide for two different line spacings. Three different line spacings can be similarly accommodated accordingly with three sets of parts, and so on. Only one section is shown for clarity. The second section is similar and a conventional change lever or the like is set each time a different type size is selected. A conventional card-feed throat (not shown) may be arranged in front of the scanner to control the feeding and positioning of cards. Conventional card-feed throat drive rolls may move the cards to one side against a guide rail and up into contact with card pressure rolls 62 and 64 in contact with the platen 30. With this arrangement cards are placed, one at a time, into the throat and driven by feeding rolls against the card pressure rolls 62 and 64. The latter are poised, under spring pressure, ready to grip the card as soon as the platen 30 begins to move. This movement occurs immediately after a line of characters is recognized. From then until the recognition is complete, the card is held by the friction between the pressure rolls 62 and 64 and the main drive platen 30. After a card leaves the control of these rolls, it is carried out the back of the scanner by four belts 71–74 which are moving at the same rate as the periphery of the platen 30. Card guides 76 and 78 hold the cards down on the belts 71–74. Short single sheets of paper may be used with this scanner much as in the conventional typewriter. Registration is improved with a conventional pin-feed platen and paper punched for it. For many applications long webs of paper from rolls or manifold packs are efficacious. Again plain or pin-feed webs may be used as desired.

Also arranged on the brackets 24, 25, and 26 are a rod 82 and a bar 84 forming ways along which a carriage 90 is arranged to travel. The bar 84 has teeth 86 on the edge facing the rod 82 forming a rack and a V-groove 88 along the opposite edge, a triad of rollers 91, 92, and 93, the latter two of which are better seen in FIG. 3, roll along the ways for guiding a carriage 90 to the chassis 92 of which the rollers are pinned. The chassis 92 is attached to a cord 94 passing over guide pulleys 96 and 97 and a takeup pulley 98. A drive pulley 100 propels the cord 94 at a rate determined by conventional gearing of the drive and gearbox 44.

Although ambient light may be quite sufficient for some purposes, the document preferably is illuminated by a suitable light source (not shown) as optical character recognition apparatus in general always functions much better when a stable source of uniform light illuminates both the background and the characters. Inexpensive sources of suitable illumination are commercially available.

Figure 3:
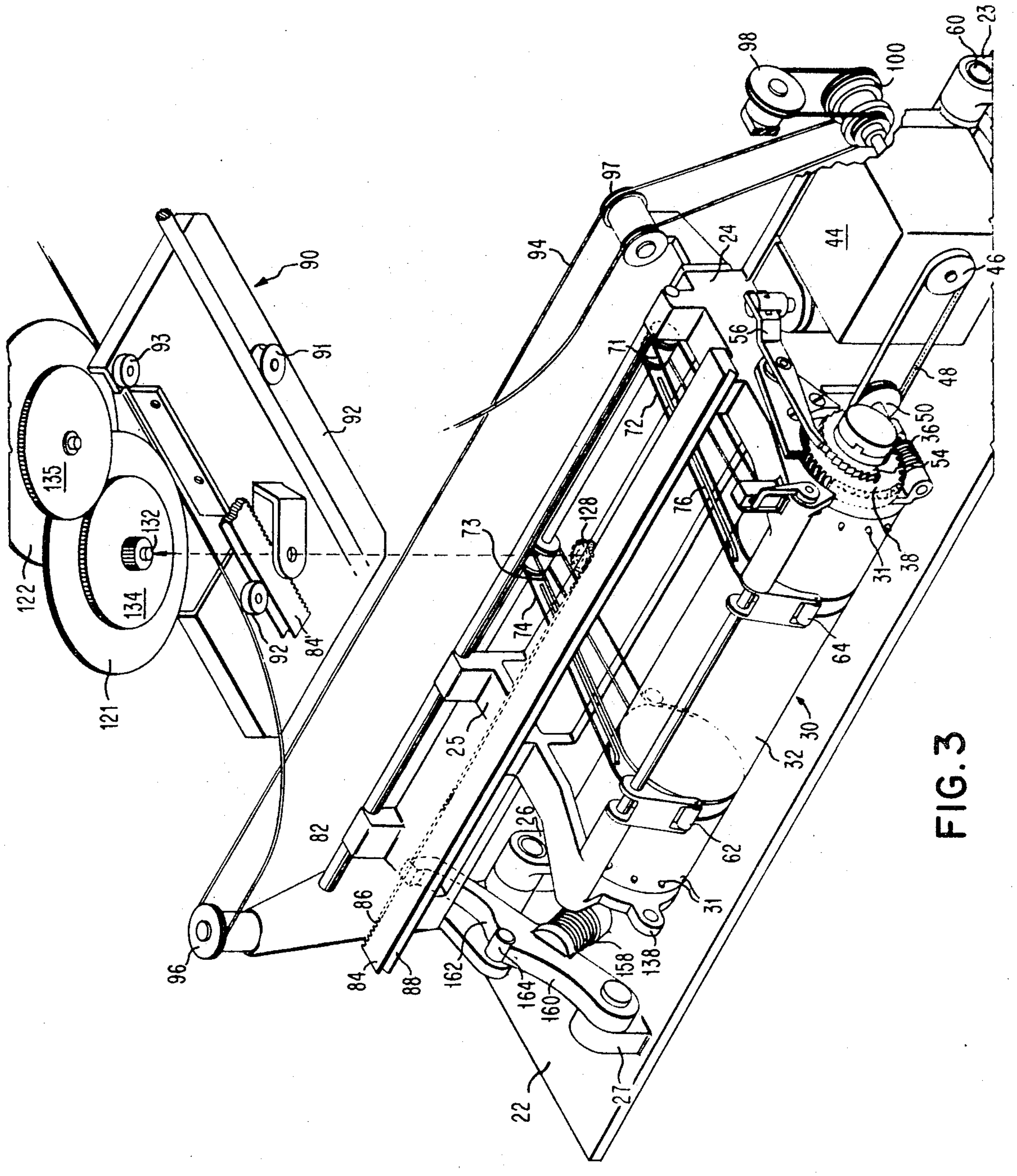
FIG. 3 is a view of part of the arrangement of FIG. 2 with the carrier out of place for clarity.

Light from the areas of the document being scanned is reflected by means of a mirror 102 arranged on an arm 104 carrying another mirror 106 for reflecting the light through a suitable lens system 108 through another mirror 110, which is just barely visible, through apertures when coincident in a pair of disks 121 and 122 and finally to a photoresponsive element (not shown) within a housing 126. The arm 104 carrying the mirrors 102, 106, and 110 and the lens system 108 are mounted on chassis 92 of the carriage 90 for movement along the ways therewith. A pinion 128, as shown in FIG. 3, cooperates with the teeth 86 in the V-way bar 84, a portion 84' of which is shown as in duplicate in FIG. 3, for driving a shaft 132, arranged for rotating the disks 121 and 122 to be rotated completely in synchronism with the position of the beam of light scanning the document. As will later be described, slits and slots in the disks 121 and 122 sequentially uncover each of the 12 areas in each character and the photoresponsive element in the housing 126 delivers a potential of two levels corresponding to a mark and the absence of a mark. Preferably a small compact integrated circuit amplifier is contained with the housing 126 and the output is carried by means of conventional lightweight cable to electronic circuitry latter to be described.

Figure 4:
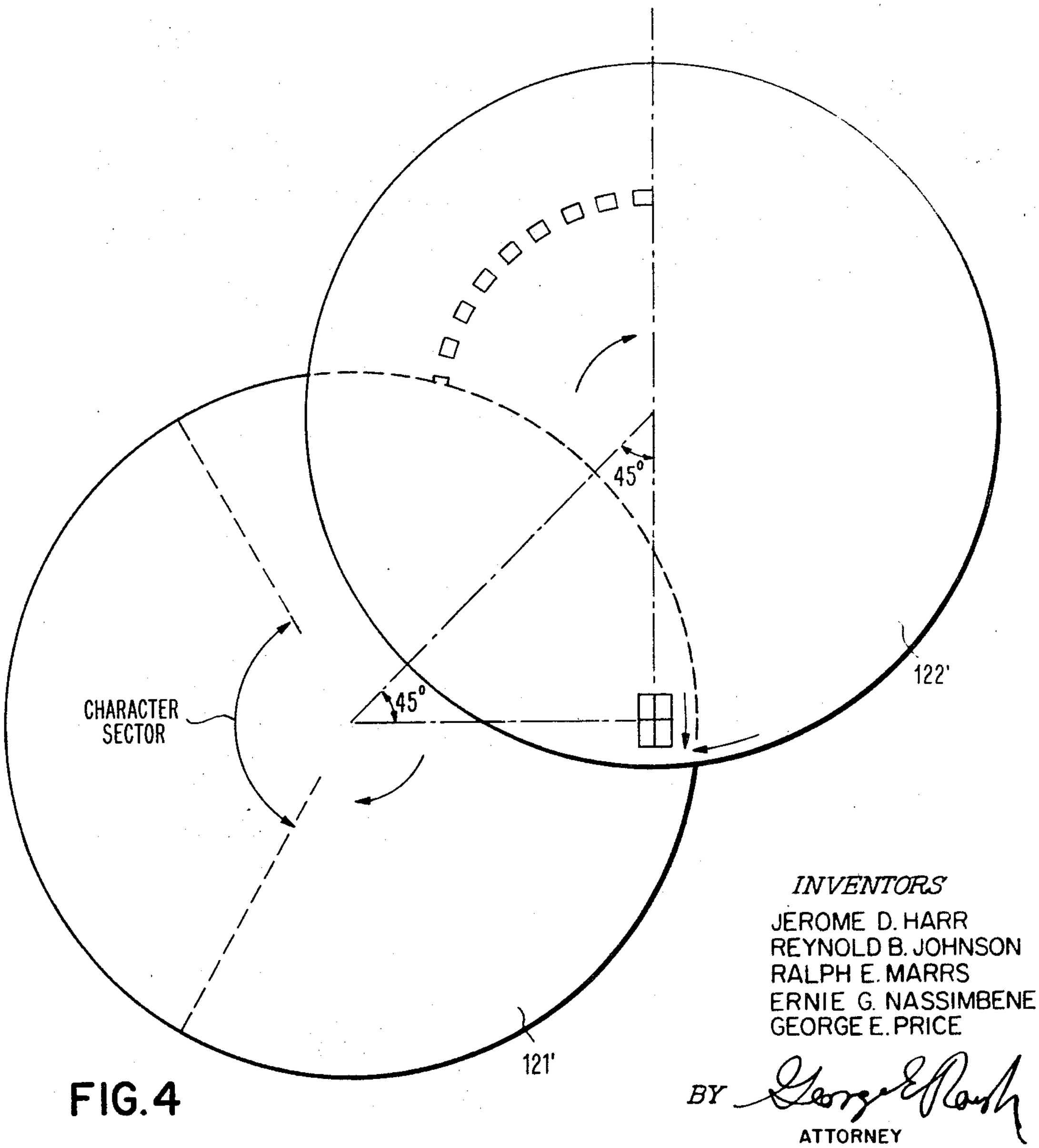
FIG. 4 is a schematic diagram illustrating the principles of operation of the scanning apparatus according to the invention.

The areas or "fields" to be scanned are sequentially passed by the photoresponsive element. The physical disection of the character in an optical sense is carried out by the two overlapping disks 121, 122. The disks are arranged so that their shutters lie at the end of the hypotenuse of a 45° right triangle as shown in FIG. 4. The center of the image is projected onto the right (90°) corner of the triangle. By making the image sufficiently small and the radius to the image center sufficiently large, orthogonal scanning can be approximated by the peripheral curvilinear motion of the disks.

The 45° and 90° angles are preferable from some standpoints but are not limitations in any way. It should be understood that variations in the angles will be possible and the desired results still obtainable for all practical purposes. With different type families, different angles may indeed be more desirable.

Figure 5:
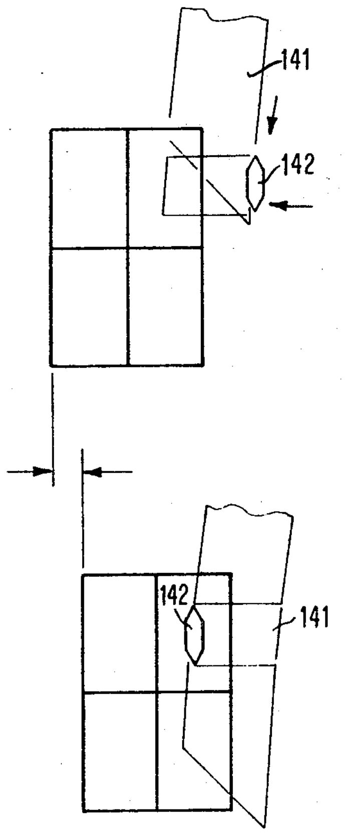
FIG. 5 is another schematic diagram of the principles of the scanning apparatus according to the invention.

Referring to FIG. 5, a large slot 141 in one disk (121 for example) and a small slit 142 in the other disk 122 (to correspond) move substantially normally to each other as shown on the diagram in scanning a vertical mark. To scan a horizontal mark or the field in which the mark should appear, slit and slot positions are reversed (for the above example, the slot is in disk 122 and the slit is in disk 121). For the purposes of analysis, it is convenient to consider the document to be moving relative to the disks. To be able to scan a constantly moving image, the edges of the slot must lie at an angle to the direction of peripheral motion. The image is then "followed" by the slot. The loci of the image centers along the curves near the periphery of the disk on 121 is an Archimedes spiral, as can be seen in FIG. 6.

It will be noted that there are two points at which the disks overlap and move substantially orthogonally to each other. Based on this fact, an alternate embodiment of the invention conceivably has two sets of slits and slots in each disk. One set is for scanning across the document in one direction for one line of characters as described. The other set is for scanning in the reverse direction as the carriage is returned to the beginning of the next line. To be sure, the slits and slots probably will not move strictly orthogonally in this version because of space limitations. In the more practical situations, however, as mentioned before, this will be no problem in achieving the desired results in practice. In addition, with the latter arrangement, the utilization components must have the additional capability of storing a line of information and subsequentially delivering it in inverse order of storage, but many installations do have this ability and the added complexity is offset by the ability to use the time saved to advantage.

The drive pulley 100 is arranged with a plurality of grooves for propelling the cord 94 at different speeds so that unidirectional scanning can be accomplished with a fast carriage return. Different sizes of characters can be scanned by changing the rack and pinion, but preferably a changeable ratio gearbox, of conventional construction, is interposed between the pinion gear and the disks. A simple gearshift lever is provided in this instance. Preferably provision is then made for changing lenses in the lens system 108 so that the image size corresponds to the speed of scan. A simple turret arrangement (not shown) is contemplated for an arrangement to have three or more lenses. A simple slide arrangement with an index can accommodate two lenses. It is only necessary to set the lens slide and the gearshift lever to the same index for a given size of character.

This scanning apparatus is designed to be used in conjunction with the printing apparatus shown and described in the above-mentioned copending U.S. Pat. application Ser. No. 829,653 so that a web of paper in effect forms a buffer between the two machines. In this configuration, the scanning apparatus is arranged immediately above the printing apparatus. A web of paper is placed in the printing apparatus and then led directly into the scanning apparatus. As the printing apparatus is operated, the scanning apparatus is able to read the next line of print immediately above the line being printed. If the scanning apparatus is momentarily prevented from operation, as for example in waiting for a computer instruction or the like, the printing apparatus can continue. In order to do so, the scanning head is held in position on the web. As the web moved out from the printer, the scanning head is arranged to swing generally upward about the shaft 60 in synchronism with the paper feed from the printing apparatus. Then as the scanning apparatus operates again, the head will swing forward as a line of information is scanned.

The mechanism that provides for swinging is shown in FIG. 7 which is a view looking at an end plate 138 in the direction of the platen 30. A pulley 140 is coupled to the platen shaft by an electromagnetic clutch 142 having a detent mechanism. A similar pulley 144 is arranged on the platen shaft of the associated printer. The pulleys are of dimensions that move the web of paper the same distance over the two platens. The two pulleys are operated by a belt 146 of the timing-toothed variety. Tension in the belt 146 is maintained by an idler pulley 148 carried on a takeup arm 150 having an arcuate slot 152 into which a pin 154 projects. The pin 54 is fixed to the carriage frame by a bracket 156. The proper tension is maintained by this mechanism as the combination operates due to the shape of the slot 152. Alternatively a pin-feed paper web can be used in an arrangement eliminating the need for the timing belt and pulleys, provided a takeup device is arranged to maintain web tension. This takeup device can be very much like the one shown for the belt but exerting its influence on the paper web. Line feed signals only are necessary to make the scanner follow the desired line of characters.

The movement of the head with respect to the web is counterbalanced by a spring 158 and a lever 160 having a simple cam arrangement. The arrangement provides a constant force against the follower 164 to the surface 162 on which a cam follower 164 rides to swing the head upward toward the back position. Thus, constant bias is designed into the counter balance.

Associated with the ratchet 54 and pawl 56 shown in FIGS. 2 and 3, is a skip mechanism shown in more detail in FIG. 8. In addition to the ratchet 54 and pawl 56 is a setscrew 168 and and adjustable cam 170 which is constructed of a flat strip of thin spring steel fastened on one end to hub 172 and constrained in a groove 174 in the side of the ratchet 54. The spring cam 170 is also constructed by a plate, not shown, that has a mating groove. The cam 170 is therefore constrained by its edges in a groove of the shape shown. The cam 170 is normally contained in the inner circle and the crossover groove. By rotating the hub 172 the cam 170 is caused to move into the outer groove. The outer surface of the cam 170 is a cam surface which is contacted by the setscrew 168. If the setscrew 168 is contacting the spring strip cam 170, the pawl 56 is prevented from entering the ratchet 54 so that the ratchet 54 continues to rotate to a home position. The spring strip cam 170 must be positioned in alignment with a ratchet face. A simpler way of skipping is had by generating line feed pulses each time a line is to be skipped.

A functional diagram of circuitry used with the scanner according to the invention is shown in FIG. 9. The scanning disks are represented by the sections 121' and 122'. A source of light, such as lamps 181, 182 illuminate the apertures in the disks. A pair of photoresponsive devices 184, 185 detect light passing through the apertures. Timing wave pulses are generated by the clocking photoresponsive device 185 as light passes through timing wave apertures. These pulses are amplified by a conventional preamplifier circuit 186 and applied to analog control circuitry which generates a multiple of timing waves for operating the line segment detecting circuitry.

The photoresponsive device 184 is connected to a preamplifier stage 190 and a clamped level signal amplifier 192. The output of the latter is applied to a positive peak storage circuit 194 and a negative peak storage circuit 196. The output of the positive peak storage circuit is applied directly or indirectly by operating a selector switch 197 through a threshold level adjusting circuit 198 to a threshold comparator 200 to which the output of the negative peak storage circuit is also applied. The output of the threshold comparator 200 delivers a bistatic signal train at output terminals 202 in synchronism with a timing wave from analog control circuitry 188 at output terminals 204 for utilization by the subsequent circuitry connected to these output terminals 202 and 204.

FIG. 10 is a graphical representation of the idealized output of the recognition photoresponsive device 184 together with the binary data output at the output terminals 202 and a sampling pulse wave such as might appear on timing valve output terminals 204. Fourteen scans are represented here for each character. Scans 1–12 are scans of the 12 line segments which make up an MQP or an OQR-character. Scans 1 and 13 are actually start and stop pulses for communication purposes. The scans 1 and 13 correspond to the units level in the binary code and are generated entirely on the disks by having a scanning aperture on one of the disks scan over an opaque line on the other disk.

At this point, perhaps it should be recognized that the scanner according to the invention is capable of being arranged with more (a total of 18 for example) sets of slits and slots for scanning the intercharacter and interline spaces immediately following and immediately below each character. This arrangement provides a complete scan of an entire page and is useful in sensing and evaluating segments making up a graphical display extending over an area in which a great number of characters would be found. Educational systems are greatly enhanced with such scanning capability.

One of the scans, similar to scan 2 in FIG. 10 is represented in greater detail in FIG. 11. This curve shows the amplifier output voltage against time as a mark is being scanned. Initially the output of the signal amplifier 190 is that "dark level" voltage $V_1$ shown at the time $t_1$ where only ambient light reaches the recognition photosensitive device 184. At the time $t_2$the apertures on the disks are beginning to coincide and permit light from the card 34' to impinge on the photosensitive device 184. At the time $t_3$, the disks are completely open above the field of scan to the maximum amount of light that is reflected from the background of the card 34' and is transmitted to the photosensitive device 184 resulting in a "-background level" voltage $V_2$ at the output of the amplifier 190. This voltage begins to drop at time $t_4$ as the scan begins to pass over the image of a mark on the document 34'. The light output then decreases due to the absorption of light by the mark. At the time $t_5$, the image of the mark completely fills the aperture resulting in the "mark" level voltage $V_3$ as the scanning continues over the mark, the light returns to the background level corresponding to the "background level" voltage $V_2$. At the time $t_7$ scanning apertures in the disk start closing and the light falls to the ambient voltage $V_1$ at the time $t_8$.

While the invention has been shown and described particularly with reference to a preferred embodiment thereof, and various alternative structures have been suggested, it should be clearly understood that these skilled in the art may effect further changes without departing from the spirit and scope of the invention as defined hereinafter.

The invention claimed is:

1. Character recognition scanning apparatus for analyzing a document bearing characters of a type family composed of spaces and a number (including unity) of elongated line segments with each contingent segment extending in one of a plurality of substantially different predetermined directions comprising, a pair of disks each having a multiple of apertures arranged about the centers thereof, means for rotating said disks and for moving said document in a line parallel to a line of characters thereon, said disks being arranged in overlapping relationship for successive intersection of said apertures in both disks at an analyzing zone of an area of the order of the area of said characters at the center of which zone said apertures are moving in directions substantially normally to each other, means for establishing the image of a contingent line segment of a character to be analyzed within said zone, said apertures in each disk comprising elongated slits and elongated slots relatively longer and wider than said slits, the longitudinal axes of the slits in each disk being arranged substantially normal to the longitudinal axes of the slots in the same disk, the slots in both disks being arranged to pass substantially parallel to the direction of and substantially along the corresponding contingent line segments within said zone, the slits in both disks being arranged to pass substantially parallel to the direction of and substantially normally across said corresponding contingent segments within said zone, and means including an optical path structure through apertures within said zone for producing one of two electric representations corresponding to the presence and absence of a line segment in response to the light intensity about the contingent line segment of said image being scanned within said zone.

2. Character recognition scanning apparatus as defined in claim 1, and wherein said means for moving said document is arranged for moving it continuously.

3. Character recognition scanning apparatus as defined in claim 1 and wherein said disks are rotating at the same rate.

4. Character recognition scanning apparatus as defined in 1 wherein said disks are rotating in opposite directions.

5. Character recognition scanning apparatus as defined in claim 2 and wherein said means for moving said document is arranged for moving it in a direction opposite to the direction of movement of that portion of one of said disks within said zone.

6. Character recognition scanning apparatus as defined in claim 1 and wherein said slots are arranged to expose a substantially large portion of a contingent line segment within said zone and said slits are arranged to expose only a central portion of said contingent line segment within said zone.

* * * * *